Dec. 8, 1959    E. P. TURNER    2,916,120
CONTROL SYSTEMS FOR CLUTCH-BRAKE MOTORS
Filed May 22, 1957    2 Sheets-Sheet 1

INVENTOR.
Edgar P. Turner
BY
Marshall J. Breen
ATTORNEY

WITNESS
William Martin

Dec. 8, 1959  E. P. TURNER  2,916,120
CONTROL SYSTEMS FOR CLUTCH-BRAKE MOTORS
Filed May 22, 1957  2 Sheets-Sheet 2

INVENTOR.
Edgar P. Turner
BY
Marshall J. Breen
ATTORNEY

WITNESS
William Martin

United States Patent Office 2,916,120
Patented Dec. 8, 1959

2,916,120

CONTROL SYSTEMS FOR CLUTCH-BRAKE MOTORS

Edgar P. Turner, Watchung, N.J., assignor to The Singer Manufacturing Company, Elizabeth, N.J., a corporation of New Jersey Application May 22, 1957, Serial No. 660,780

5 Claims. (Cl. 192—18)

This invention relates to control systems for clutch-brake motors and more especially to actuating means responsive to the actual application of the braking force for operating auxiliary devices coincident with or in timed relation with said force application.

It has been customary to operate a switch from the same movement which sets the brake on a clutch-brake motor where, for example, it is desirous to control an auxiliary device responsively to the stoppage of the drive. This has a serious disadvantage when close timing is important due to the fact that normal brake wear requires frequent resetting to insure proper sequential operation.

This difficulty has been overcome in accordance with the present invention by making the operation of the auxiliary device responsive to the magnitude of the braking torque itself.

It is, therefore, a primary object of this invention to provide structure for deriving a movement responsively to the braking torque of a clutch-brake motor, which movement causes actuation of an auxiliary device.

It is a further object of this invention to provide adjustable means for varying the braking torque necessary to cause actuation of the auxiliary device.

With the above and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby, will be readily understood by those skilled in the art.

The present invention is illustrated as applied to a clutch-brake motor 10 of the type shown and described in the United States Patent No. 2,617,051 to which reference may be had for a more complete understanding of the operation thereof.

Figure 2:
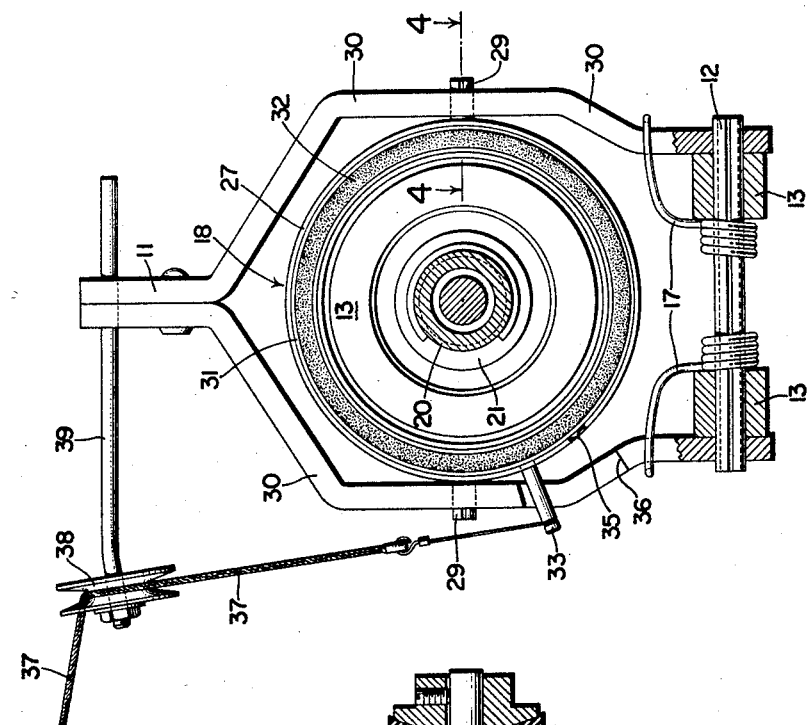
Fig. 2 is an elevational view, partly in section, taken on the line 2—2 of Fig. 1.
Figure 1:
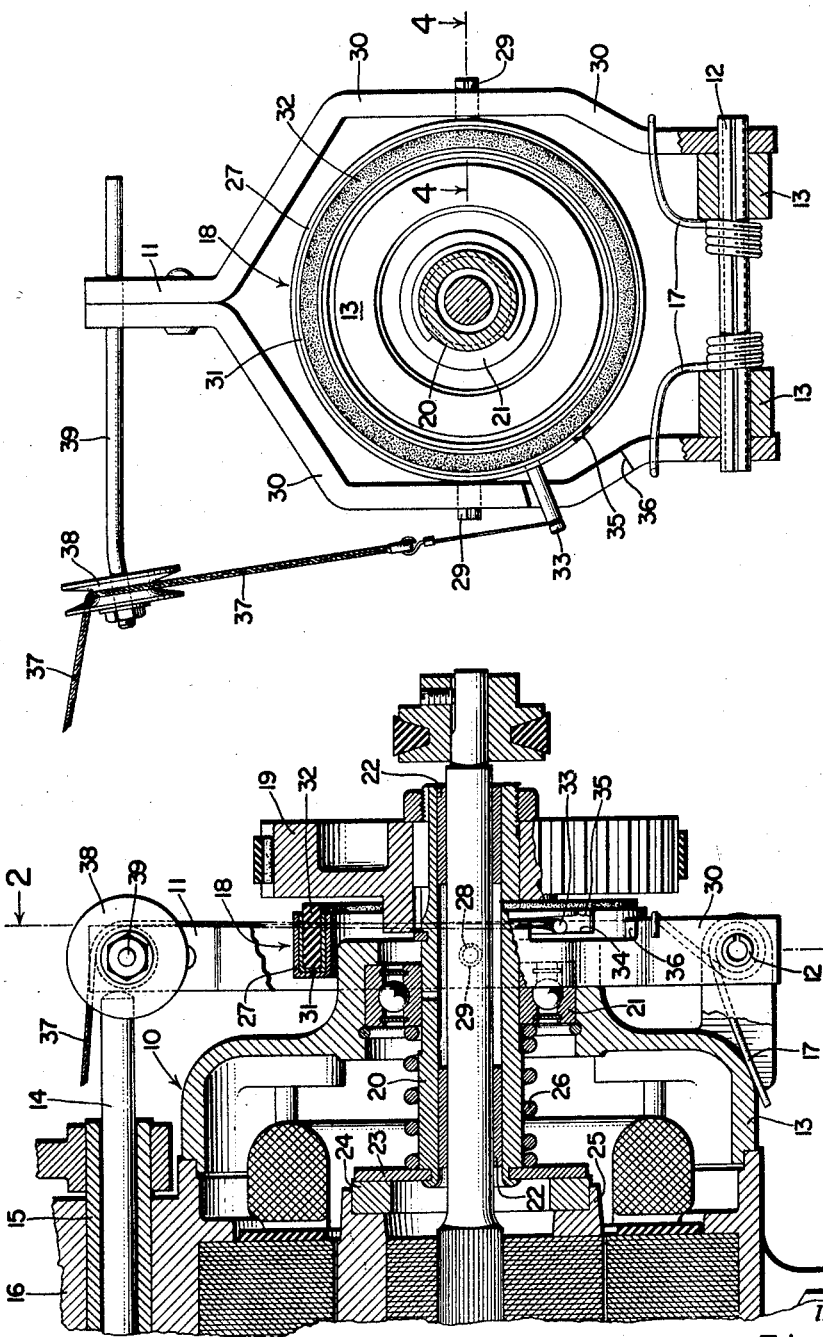
Fig. 1 is a fragmentary longitudinal sectional view of a clutch-brake motor embodying the invention.

Referring to Figs. 1 and 2, the clutch-brake motor 10 has a clutch-actuating lever 11 which pivots about a pin 12 secured to the motor end bell 13. An operating rod 14 slidable in a bushing 15 secured to the motor frame 16 contacts the upper end of the lever 11 to urge said lever against the biasing torque provided by springs 17—17. Movement of the lever 11 as viewed in Fig. 1 carries a braking element 18 (to be described presently) into and out of engagement with a power take-off pulley 19 which is mounted for rotation with a hollow shaft 20 carried by a ball bearing 21 on the exterior and by bushings 22—22 on the interior. The hollow shaft 20 is free to slide endwise and carries at one end a clutch plate 23 which is normally urged frictionally against a friction ring 24 of the motor rotor 25 by a biasing spring 25 and thus transmits driving torque to the pulley 19.

It will be seen that, in the relation of the parts as seen in Fig. 1, the pulley 19 is driven by the rotor 25 through selective frictional engagement of the clutch plate 23 with the ring 24 and represents the power transmitting position.

Figure 3:
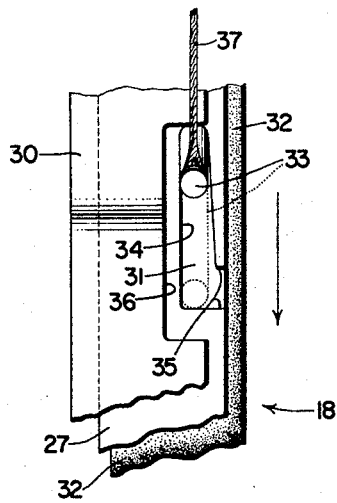
Fig. 3 is an enlarged detail of part of the device of Fig. 1.
Figure 4:
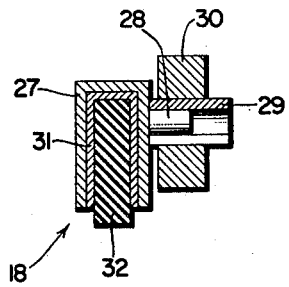
Fig. 4 is an enlarged sectional view taken on the line 4—4 of Fig. 2.

The braking element 18 comprises an outer annular cup member 27 pivoted on diametrical pins 28—28 journaled in bushings 29—29 fitted into spaced limbs 30—30 of the clutch-actuating lever 11 as seen best in Fig. 2 and Fig. 4. A second annular cup member 31 is fitted within the pivoted cup member 27 to be rotatably slidable therein and carries a ring or collar 32 of friction material fixed thereto. The inner cup member 31 carries a radial pin 33 which moves in a slot 34, seen best in Fig. 3, and formed in the outer peripheral wall of the pivoted cup 27 to provide for limited rotation and a captive relation between the two cup members. The slot 34 has an open end 35 to facilitate assembly of the parts. A notch 36 is cut into one of the limbs 30 to provide operating clearance for the pin 33.

Figure 5:
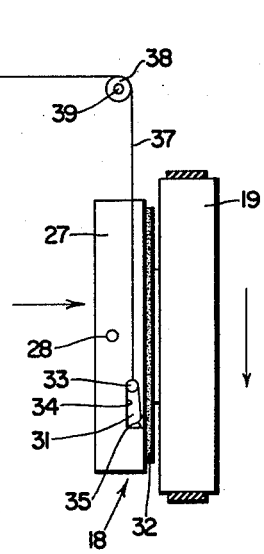
Fig. 5 is a schematic view showing the device of Fig. 1, as used in a typical system.

A flexible but non-extensible cord 37 connected at one end to the pin 33 passes over a pulley 38 carried by a rod 39 secured to the lever 11, as seen in Fig. 2, and transmits the motion of the pin 33 to any exterior device which it is desired to actuate. For example, in Fig. 5 the cord 37 terminates in a cam plate 40 which is biased by a spring 41 which may be adjusted by a thumb nut 42 to alter the initial bias as desired. The cam plate 40 is operatively associated with a pressure sensitive switch 43 to open or close a circuit 44 and thus to control any external device responsively to motion of the pin 33.

It will be seen that the pin 33 cannot move until the braking torque transmitted to it by frictional contact between the pulley 19 and the friction ring 32 is great enough to overcome the bias exerted by the spring 41. Thus, the actuation of the switch 43 cannot take place until there is a braking force applied to the pulley 19 and further, this actuation may be selectively delayed a desired amount by adjustment of the initial bias of the spring 41 by the thumb nut 42. In this manner the actuation of the external device is tied to the braking force itself and thus the relative timing of these events becomes independent of brake wear which would otherwise require frequent and thus undesirable compensation.

Having thus set forth the nature of the invention, what I claim herein is:

1. In a clutch-brake motor a driving rotor, a driven element, means normally connecting the driven element to the rotor, a friction collar movably axially to disconnect the driven element from the rotor and to apply braking friction to the driven element, a pivoted carrier for supporting the friction collar while permitting limited rotation of the collar due to the torque reaction of the braking friction, biasing means opposed to the rotation thus produced for establishing a reference angular position for the collar in the unbraked condition of the driven element, and means connected to the collar for transmitting the limited rotary motion to operate an external device in response to the application of the braking friction to the driven element.

2. In a clutch-brake motor a driving rotor, a driven element, means normally connecting the driven element to the rotor, a friction collar movable axially to disconnect the driven element from the rotor and to apply braking friction to the driven element, a pivoted carrier for supporting the friction collar while permitting limited rotation of the collar due to the torque reaction of the braking friction, biasing means opposed to the rotation thus produced for establishing a reference angular position for the collar in the unbraked condition of the driven element, and means connected to the collar for transmitting the limited rotary motion to operate an external device in response to the application of the braking friction to the driven element, and means to adjust the biasing means to set the braking torque necessary to rotate the collar.

3. In a clutch-brake motor, a driving rotor, a driven element, means normally connecting the driven element with the rotor, manually responsive means for disconnecting the driven element from the rotor and applying braking friction to the driven element comprising a lever pivoted on the clutch-brake motor, a carrier ring pivoted on the lever, a friction collar held in the carrier ring but free to rotate relative thereto by a limited amount when the friction collar engages the driven element, adjustable biasing means for establishing a predetermined angular position for the collar in the unbraked condition of the driven element, and means for transmitting the limited rotary movement of the collar to operate an external device when the braking torque reaches a predetermined value set by the adjustable biasing means.

4. In a clutch-brake motor, a rotary driving element and a rotary driven element positioned on a common axis of rotation, the driven element being slidable along said axis to engage the driving element in torque-transmitting relation, spring biasing means urging said driving and driven elements normally into the engaged position, a biased lever pivoted on said motor, a ring carrier pivoted on the lever and positioned on the common axis, a friction collar mounted on said ring carrier and having limited rotation relative thereto about the common axis, adjustable means for biasing the friction collar in an initial angular position, means for moving said lever to press the friction collar axially into engagement with the driven element to apply braking friction to the driven element and to impart rotation to said collar away from its biased position and means for transmitting the rotary movement thus imparted to an external device to actuate same.

5. In a control system for operating a device responsively to and in timed relation with the application of a braking torque to a normally rotating element, a driving element, a driven element normally coupled frictionally to the driving element, means for uncoupling the driven element from the driving element and applying a braking torque to the driven element comprising an annular carrier ring, a friction collar held in the carrier ring but free for limited rotation relative thereto, lever means supporting the carrier ring and manually movable to urge the friction collar against the driven element to apply a braking torque thereto and to impart a limited rotation to the friction collar, and means for translating said rotation into motion for initiating the operation of an external device.

References Cited in the file of this patent
UNITED STATES PATENTS

| 2,433,003 | Swennes | Dec. 23, 1947 |
| 2,727,162 | Fuge | Dec. 13, 1955 |

FOREIGN PATENTS

| 694,769 | Great Britain | July 29, 1953 |